United States Patent
Moon et al.

(10) Patent No.: US 10,608,544 B2
(45) Date of Patent: Mar. 31, 2020

(54) AUTOMATIC CONTROL OF SYNCHRONOUS RECTIFIER TURN-OFF THRESHOLD

(71) Applicant: SEMICONDUCTOR COMPONENTS INDUSTRIES, LLC, Phoenix, AZ (US)

(72) Inventors: Sangcheol Moon, Bucheon (KR); Hangseok Choi, Suwon (KR); Chi Chen Chung, Zhubei (TW); Cheng-Sung Chen, Hsinchu (TW)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/135,166

(22) Filed: Sep. 19, 2018

(65) Prior Publication Data
US 2019/0020283 A1    Jan. 17, 2019

Related U.S. Application Data

(63) Continuation of application No. 15/486,919, filed on Apr. 13, 2017, now Pat. No. 10,110,137.

(51) Int. Cl.
*H02M 3/335* (2006.01)
(52) U.S. Cl.
CPC ... *H02M 3/33592* (2013.01); *H02M 3/33523* (2013.01); *Y02B 70/1475* (2013.01)
(58) Field of Classification Search
None
See application file for complete search history.

(56) References Cited

U.S. PATENT DOCUMENTS

| | | | |
|---|---|---|---|
| 5,872,710 A | 2/1999 | Kameyama | |
| 7,199,636 B2 | 4/2007 | Oswald et al. | |
| 10,177,659 B2* | 1/2019 | Dalena | H02M 3/158 |
| 2009/0256509 A1 | 10/2009 | Hiramine | |
| 2014/0078787 A1 | 3/2014 | Sonobe | |
| 2014/0376275 A1 | 12/2014 | Ohashi | |
| 2015/0115911 A1* | 4/2015 | Parto | H02M 3/158 323/271 |
| 2017/0222569 A1* | 8/2017 | Choi | H02M 1/088 |
| 2017/0237337 A1* | 8/2017 | Antongirolami | H02M 1/38 323/271 |
| 2017/0366080 A1 | 12/2017 | Chang et al. | |

* cited by examiner

*Primary Examiner* — Jeffrey A Gblende
(74) *Attorney, Agent, or Firm* — AMPACC Law Group, PLLC

(57) ABSTRACT

A Synchronous Rectifier (SR) controller circuit includes a dead time evaluation circuit, an offset voltage controller circuit, an off threshold control circuit, and a comparator circuit. The dead time evaluation circuit produces an indication of whether a measured dead time of an SR switching device is less than a target dead time. The offset voltage controller circuit determines an offset count using the indication, an offset voltage using the offset count, and high and low saturation indicators according to the offset count. The off threshold control circuit determines a threshold count using the high and low saturation indicators and an off threshold voltage using the threshold count. The comparator circuit determines whether a measured voltage of the SR switching device is greater than a virtual off threshold voltage, the virtual off threshold voltage corresponding to the off threshold voltage minus the offset voltage.

18 Claims, 7 Drawing Sheets

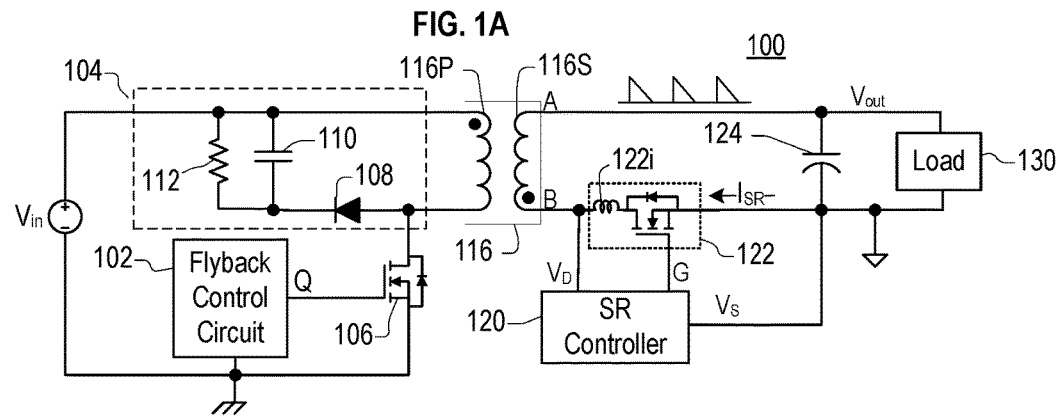
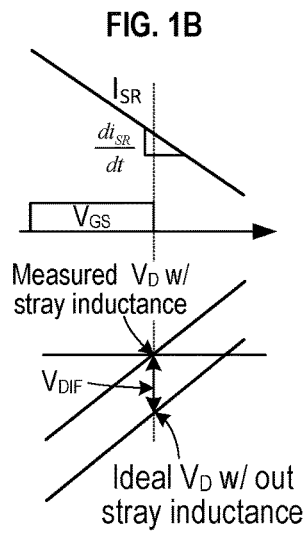
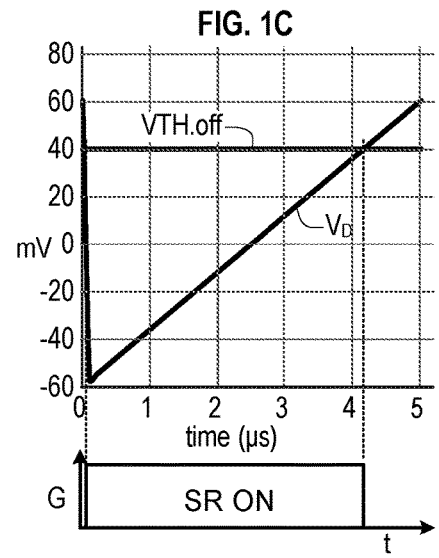
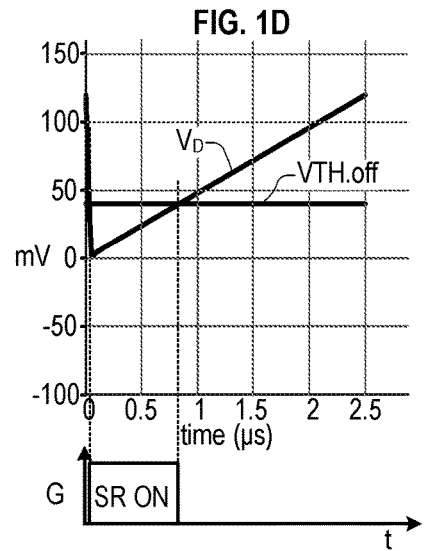
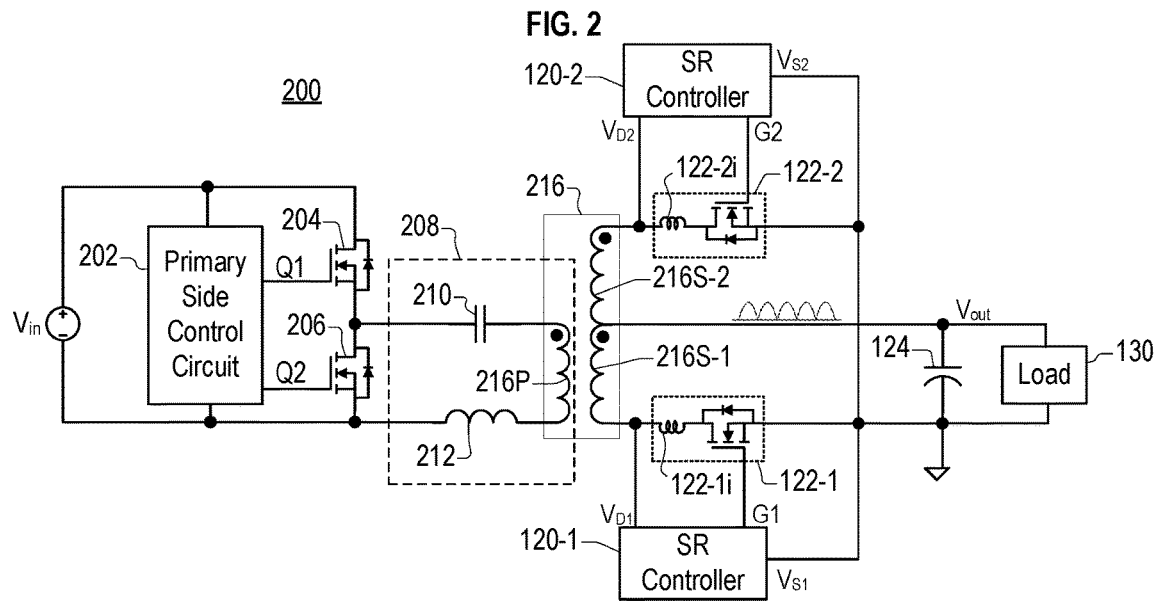

AUTOMATIC CONTROL OF SYNCHRONOUS RECTIFIER TURN-OFF THRESHOLD

RELATED APPLICATIONS

This application is a continuation of U.S. patent application Ser. No. 15/486,919, filed Apr. 13, 2017, which is incorporated by reference in its entirety.

FIELD OF THE DISCLOSURE

The present disclosure relates generally to rectifying circuits, and more particularly to synchronous rectifier control circuits used in power converters.

BACKGROUND

The present disclosure relates, in general, to electronics, and more particularly, to circuits and method for providing power to electronic devices. Such circuits may use Synchronous Rectification (SR) circuits, in which an Alternating Current (AC) supply voltage is rectified using one or more switching devices, such as transistors, that are switched on and off synchronously with the AC supply voltage. The switching devices may be controlled by signals from an SR control circuit.

The SR control circuit may turn a switching device on and off in response to a voltage across the switching device or a current passing through the switching device. A first threshold, i.e., an on threshold, may be used when determining whether to turn the switching device on. A second threshold, i.e., an off threshold, may be used when determining whether to turn the switching device off. A third threshold, i.e., a conduction detection threshold (which may also be referred to as an SR off detection threshold), may be used to determine that the switching device is no longer conducting current.

Reactive components associated with the switching device, such as a lead frame inductance of the switching device, may cause ringing or spikes in the voltage or current sensed by the SR control circuit. Such ringing or spikes have the potential to cause a premature change in the state of the switching device. For example, when the switching device is turned on, a ringing in the voltage or current sensed by the SR control circuit by the switching device may result, which may cause the SR control circuit to turn the switching device off prematurely, resulting in a reduction in the efficiency of the SR circuit.

A stray inductance in the circuit, such as a lead frame inductance of the switching device, may have a voltage drop across it due to a change in a current flowing through the stray inductance. The voltage drop across the stray inductance may alter a voltage that is being sensed in order to control the switching device. This alteration to the sensed voltage may lead to undesirable behavior, such as a premature turning off of the switching device. Prematurely turning off the switching device may, among other effects, decrease the efficiency of the circuit.

Accordingly, it is desirable to have SR control circuit that is able to automatically mitigate the detrimental effect of reactive components, such as stray inductances, of an SR circuit.

BRIEF DESCRIPTION OF THE FIGURES

In the accompanying figures, like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

FIG. 1A illustrates a flyback converter according to an embodiment.

FIG. 1B illustrates an effect of a stray inductance on a drain voltage of the half-wave flyback converter of FIG. 1A.

FIG. 1C further illustrates the effect of the stray inductance on the drain voltage and on the operation of the flyback converter of FIG. 1A.

FIG. 1D further illustrates the effect of the stray inductance on the drain voltage and on the operation of the flyback converter of FIG. 1A.

FIG. 2 illustrates a full-wave power converter according to an embodiment.

Figure 3A:
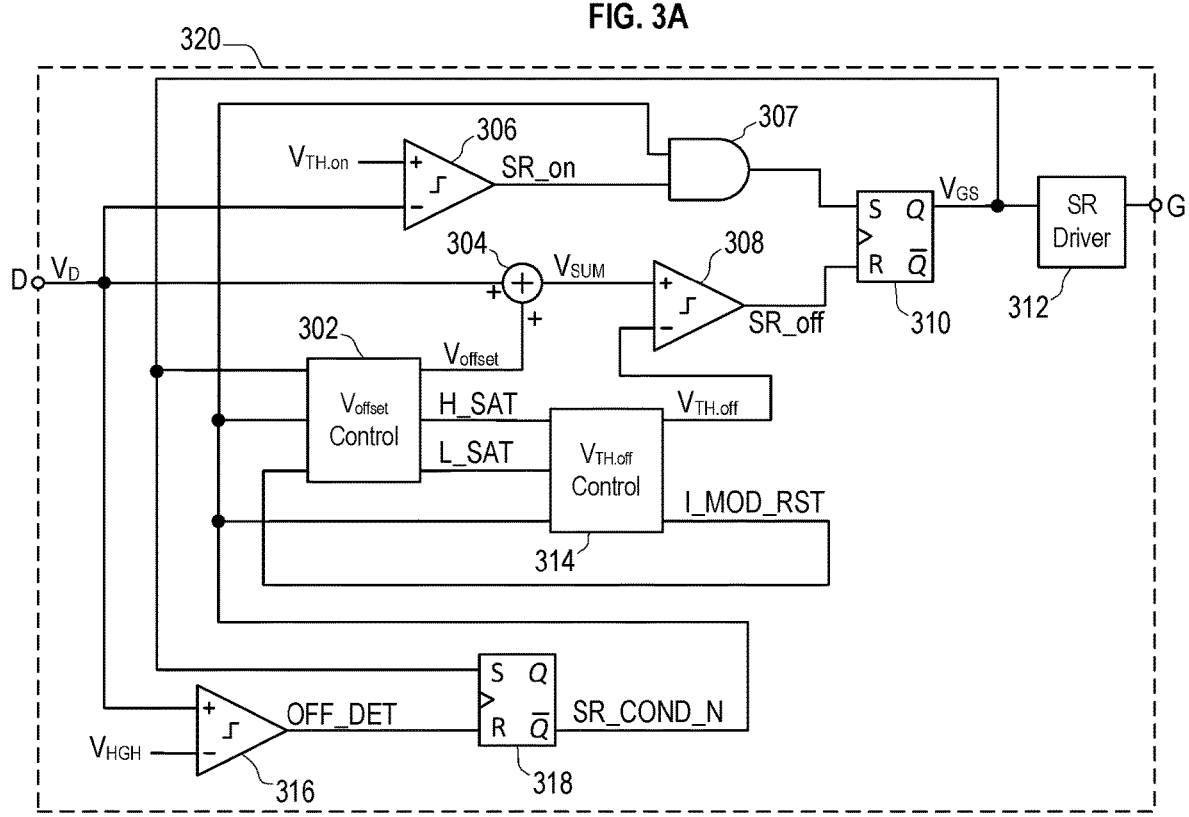
FIG. 3A illustrates a Synchronous Rectifier (SR) controller according to an embodiment.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of the embodiments.

The apparatus and method components have been represented where appropriate by conventional symbols in the drawings, showing only those specific details that are pertinent to understanding the embodiments. This avoids obscuring the disclosure with details that will be readily apparent to those of ordinary skill in the art having the benefit of the disclosures herein. The details of well-known elements, structures, or processes that are necessary to practice the embodiments and that are well known to those of skill in the art may not be shown and should be assumed present unless otherwise indicated.

DETAILED DESCRIPTION

The present disclosure relates generally to rectification circuits, and in particularly to methods and circuits for Synchronous Rectifier (SR) control.

Embodiments provide superior resistance to the deleterious effects of stray inductances, (such as stray inductances of a Printed Circuit Board (PCB) or package of a switching device of a SR circuit) on the determination of when to turn off the switching device. These potential deleterious effects include a reduction of the efficiency of the SR circuit, especially in power converters having a variable output voltage.

In one embodiment of an SR controller, a virtual off threshold voltage is used to determine when to turn off an SR switching device. The virtual off threshold voltage is implemented using an offset voltage and a (non-virtual) off threshold voltage. The SR controller controls the virtual off threshold voltage by adjusting the offset voltage in response to a difference between a dead time of the SR switching device and a target dead time, and by adjusting the off threshold voltage in response to an upper or lower limit of the adjustment possible using the offset voltage being reached.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Similar reference numerals designate similar elements in the specification.

FIG. 1A is a block diagram illustrating a flyback converter 100 according to an embodiment. A primary side of the power controller 100 includes a flyback controller circuit 102, a Metal Oxide Semiconductor Field Effect Transistors (MOSFET) 106, a snubber network 104 including a capacitor 110, a diode 108, and a resistor 112, and a primary coil 116P of a transformer 116. A secondary side of the power controller 100 includes a secondary coil 116S of the transformer 116, a Synchronous Rectifier (SR) controller 120, an SR switching device 122, and an output capacitor 124. In an embodiment, the SR switching device 122 is a MOSFET, such as an n-channel power MOSFET as shown in FIG. 1A.

The power converter 100 receives an input voltage $V_{in}$, and provides an output voltage $V_{out}$ to a load 130. The load 130 may include one or more integrated chips (ICs). In an embodiment, the output voltage $V_{out}$ is used as a supply voltage to one or more of a Universal Serial Bus (USB) circuit, a Central Processing Unit (CPU), a Graphics Processing Unit (GPU), a memory integrated circuit, and the like. In an embodiment, the output voltage $V_{out}$ may be varied.

The flyback controller circuit 102 generates a drive signal Q that is a square wave. A frequency of the drive signal Q may vary according to, for example, the output voltage $V_{out}$ (e.g., between 100 KHz and 200 Khz).

During a first (e.g., ON) portion of a cycle of the drive signal Q, the flyback controller circuit 102 turns on the MOSFET 106. This causes energy to be supplied from the input voltage $V_{in}$ to the primary coil 116P, where it is stored as a magnetic flux.

During a second (e.g., OFF) portion of a cycle of the drive signal Q, the flyback controller circuit 102 turns off the MOSFET 106. In response, the energy stored in the primary coil 116P is transferred into the secondary coil 116S, causing a current to flow in the secondary coil 116S and a voltage to develop across the A and B terminals of the secondary coil 116S. The snubber network 104 operates to prevent a turn-off voltage spiked generated across the primary coil 116P from exceeding a breakdown voltage of the MOSFET 106.

The SR controller 120 controls the SR switching device 122 to rectify the output of the secondary coil 116S, charging the output capacitor 124 and thereby providing the output voltage $V_{out}$. The SR controller 120 controls the SR switching device 122 in response to a drain voltage $V_D$ sensed at a first conduction terminal (e.g., a drain terminal) of the SR switching device 122. In the embodiment shown in FIG. 1A, the drain voltage $V_D$ is sensed relative to a source voltage of a second conduction terminal (e.g. a source terminal) of the SR switching device 122. In another embodiment, the drain voltage $V_D$ may be sensed relative to a ground potential. The SR controller 120 controls the SR switching device 122 using a gate control signal G coupled to a control terminal (e.g., a gate) of the SR switching device 122.

When the voltage across the secondary coil 116S has a first polarity, wherein the A terminal of the secondary coil 116S is negative relative to the B terminal of the secondary coil 116S, a body diode of the SR switching device 122 is reverse biased and no current flows through the body diode. The sensed drain voltage $V_D$ is greater than an off threshold voltage $V_{TH.off}$, and in response the SR controller 120 outputs the gate control signal G having a value that turns off the SR switching device 122. As a result, no current flows from the secondary coil 116S to the output capacitor 124.

When the voltage across the secondary coil 116S changes to a second polarity, wherein the A terminal is positive relative to the B terminal, the body diode of the SR switching device 122 begins to conduct. The sensed drain voltage $V_D$ becomes less than an on threshold voltage $V_{TH.on}$, and in response the SR controller 120 outputs the gate control signal G having a value that turns on the SR switching device 122. As a result, current flows from the secondary coil 116S to the output capacitor 124.

When the voltage across the secondary coil 116S starts to change back to the first polarity, the magnitude of the sensed drain voltage $V_D$ decreases and rises above an off threshold voltage $V_{TH.off}$. In response, the SR controller 120 outputs the gate control signal G having the value that turns off the SR switching device 122. The SR controller 120 may turn the SR switching device 122 off before the voltage across the secondary coil 116S changes to the first polarity.

The SR switching device 122 may include a stray inductance 122i between the point where the drain voltage $V_D$ is measured and the reference point against which the drain voltage $V_D$ is measured. The stray inductance 122i may include, for example, one or more of an inductance of one or more package leads of the SR switching device 122 and an inductance of one or more Printed Circuit Board (PCB) traces. The stray inductance 122i may be, for example, as much as 15 nanoHenries (nH).

The stray inductance 122i is in the path of the SR current $I_{SR}$ flowing through the SR switching device 122. An induced difference voltage $V_{DIF}$ is generated across the stray inductance 122i according to the stray inductance value $L_{stray}$ of the stray inductance 122i and the rate of change $\partial I_{SR}/\partial t$ in the SR current $I_{SR}$:

$$V_{DIF} = L_{stray} \times \frac{\partial I_{SR}}{\partial t} \qquad \text{Equation 1}$$

FIG. 1B illustrated how the induced difference voltage $V_{DIF}$ causes the measured drain voltage $V_D$ to vary from an ideal value of the drain voltage (that is, a value of the drain voltage that did not depend on the rate of change $\partial I_{SR}/\partial t$ of the SR current $I_{SR}$) according to the rate of change $\partial I_{SR}/\partial t$ of the SR current $I_{SR}$. The faster the SR current $I_{SR}$ is decreasing, the larger the induced difference voltage $V_{DIF}$. When the SR current $I_{SR}$ is decreasing, the measured drain voltage $V_D$ will be larger than the ideal value of the drain voltage by the value of the induced difference voltage $V_{DIF}$.

FIGS. 1C and 1D demonstrate the effect the stray inductance 122i has on an on time of the SR switching device 122. FIG. 1C illustrates a measured drain voltage $V_D$, an off threshold voltage $V_{TH.off}$, and a gate signal G for an embodiment operating at 100 KHz. FIG. 1D illustrates the measured drain voltage $V_D$, the off threshold voltage $V_{TH.off}$ and the gate signal G for an embodiment operating at 200 KHz. In each example, a same off threshold voltage $V_{TH.off}$ of 40 mV is shown.

Because the embodiment of FIG. 1D is operating at a higher frequency, the rate of change $\partial I_{SR}/\partial t$ of the SR current $I_{SR}$ is larger in the example shown in FIG. 1D than in the example shown in FIG. 1C. As a result, the induced difference voltage $V_{DIF}$ is larger in the example of FIG. 1D than in the example of FIG. 1C, as evidenced by the 60 mV difference between the drain voltage $V_D$ shown in FIG. 1C and the drain voltage $V_D$ shown in FIG. 1D.

In other embodiments, the rate of change $\partial I_{SR}/\partial t$ of the SR current $I_{SR}$ changes because the output voltage $V_{out}$ changes, even when the operating frequency of the power converter 100 does not change. For example, the rate of change $\partial I_{SR}/\partial t$ of the SR current $I_{SR}$ may increase when the output voltage $V_{out}$ increases, and may decrease when the output voltage $V_{out}$ decreases, even when the operating frequency of the power converter 100 does not change.

As a result of the higher induced difference voltage $V_{DIF}$ in the example of FIG. 1D, the measured drain voltage rises above the off threshold voltage $V_{TH.off}$ more quickly than it does in the example of FIG. 1C, resulting in a premature shut off of the SR switching device 122. In the example shown, the effect of the induced difference voltage $V_{DIF}$ is to reduce the on time of the SR switching device 122 from 4.2 μsec. to 0.8 μsec. as the frequency rises from 100 KHz to 200 KHz.

Embodiments of the power converter 100 include an SR controller that uses a virtual off threshold voltage $V_{VTH.off}$ to mitigate the effect of stray inductances on the on time of an SR switching device. Embodiments further include processes for managing the virtual off threshold voltage $V_{VTH.off}$ to mitigate the effect of stray inductances on the on time of an SR switching device.

The power converter 100 may include additional elements, such as feedback circuits, sleep circuits, startup circuits, protection circuits, and the like, which are known in the art and have been omitted in the interest of brevity.

FIG. 2 is a block diagram illustrating a full-wave power converter 200 according to an embodiment. A primary side of the power controller 200 includes a primary side controller circuit 202, first and second Metal Oxide Semiconductor Field Effect Transistors (MOSFETs) 204 and 206, and an Inductor-Inductor-Capacitor (LLC) tank circuit 208 including a tank capacitor 210, a tank inductor 212, and a primary coil 216P of a transformer 216. A secondary side of the power controller 200 includes a first and second secondary coils 216S-1 and 216S-2 of the transformer 216, first and second SR controllers 120-1 and 120-2, first and second SR switching devices 122-1 and 122-2, and an output capacitor 124. In an embodiment, the SR switching devices 122-1 and 122-2 are MOSFETs, such as n-channel power MOSFETs as shown in FIG. 2.

The power converter 200 receives an input voltage $V_{in}$, and provides an output voltage $V_{out}$ to a load 130. The load 130 may include one or more integrated chips (ICs). In an embodiment, the output voltage $V_{out}$ is used as a supply voltage to one or more of a Universal Serial Bus (USB) circuit, a Central Processing Unit (CPU), a Graphics Processing Unit (GPU), a memory integrated circuit, and the like. In an embodiment, the output voltage $V_{out}$ may be varied.

The primary side controller circuit 202 generates first and second drive signals Q1 and Q2 that are square waves that are 180 degrees out of phase. A frequency of the first and second drive signals Q1 and Q2 may vary according to, for example, the output voltage $V_{out}$ (e.g., between 100 KHz and 200 Khz).

Using the first and second drive signals Q1 and Q2, the primary side controller circuit 202 first supplies energy from the input voltage $V_{in}$ to the tank circuit 208 by turning on the first MOSFET 204 and turning off the second MOSFET 206. The primary side controller circuit 202 then allows the tank circuit 208 to oscillate by turning off the first MOSFET 204 and turning on the second MOSFET 206.

The transformer 216 of the power converter 200 is a center-tap transformer including first and second secondary coils 216S-1 and 216S-2. Polarities of voltages across the first and second secondary coils 216S-1 and 216S-2, relative to the center tap, will be opposite each other.

The secondary side of the power converter 200 includes the output capacitor 124 which is used to provide the output voltage $V_{out}$ to the load 130. Current is provided to the output capacitor 124 using the first SR switching device 122-1 controlled by the first SR controller 120-1 and by the second SR switching device 122-2 controlled by the second SR controller 120-2.

The first SR switching device 122-1 is coupled to the first secondary coil 216S-1 and the second SR switching device 122-2 is coupled to the second secondary coil 216S-2. Because the polarities of voltages across the first and second secondary coils 216S-1 and 216S-2, relative to the center tap, will be opposite each other, the first SR switching device 122-1 will provide current to the output capacitor 124 when the second SR switching device 122-2 is off and the second SR switching device 122-2 will provide current to the output capacitor 124 when the first SR switching device 122-1 is off, as each operates independently in the manner described for the SR switching device 122 of FIG. 1A.

In an embodiment, the first and second SR controllers 120-1 and 120-2 are provided in a single semiconductor device. In an embodiment, the first and second SR controllers 120-1 and 120-2 share circuits that perform functions common thereto.

The first and second SR switching devices 122-1 and 122-2 include respective first and second stray inductances 122-1i and 122-2i, and therefore the issues discussed with respect to the stray inductance 122i of FIG. 1A apply to the first and second SR controllers 120-1 and 120-2 as well. Embodiment of the power converter 200 include circuits and processes to mitigate the effects of the first and second stray inductances 122-1i and 122-2i using at least one virtual off threshold voltage, as described below.

FIG. 3A illustrates an SR controller circuit 320 (hereinafter, SR controller 320) according to an embodiment. The SR controller 320 is suitable for use as the SR controller 120 of the power converter 100 of FIG. 1A or as one or both of the SR controllers 120-1 and 120-2 of the power converter 200 of FIG. 2.

The SR controller 320 receives an drain voltage $V_D$ at a drain input D and generates a gate control signal G suitable for controlling an SR switching device, such as the SR switching devices 122, 122-1, and 122-2 shown in FIGS. 1A and 2. In the embodiment of FIG. 3, the SR controller circuit 320 senses the drain voltage $V_D$ relative to a ground (not shown), but embodiments are not limited thereto.

The SR controller 320 includes an offset voltage control circuit 302 (hereinafter, offset voltage controller 302), a summing circuit 304, and first, second, and third comparators 306, 308, and 316. The SR controller 320 further includes an AND gate 307, first and second set-reset flip-flops (SRFFs) 310 and 318, a Synchronous Rectifier (SR) driver 312, and an off threshold control circuit 314 (hereinafter, off threshold controller 314).

The first comparator 306 receives the drain voltage $V_D$ and an on threshold voltage $V_{TH.on}$, and generates an SR on signal SR_on. The first comparator 306 asserts the SR on signal SR_on in response to the drain voltage $V_D$ being less than the on threshold voltage $V_{TH.on}$, and de-asserts the SR on signal SR_on in response to the drain voltage $V_D$ being greater than the threshold voltage $V_{TH.on}$. In an embodiment, the first comparator 306 includes hysteresis to prevent oscillation of the SR on signal SR_on when the drain voltage $V_D$ is substantially equal to the threshold voltage $V_{TH.on}$.

The summing circuit 304 receives the drain voltage $V_D$ and an offset voltage $V_{offset}$ and generates a voltage sum $V_{SUM}$ equal to the sum of the drain voltage $V_D$ and an offset voltage $V_{offset}$.

The second comparator 308 receives the voltage sum $V_{SUM}$ and an off threshold voltage $V_{TH.off}$, and generates an SR off signal SR_off. The second comparator 308 asserts the SR off signal SR_off in response to the voltage sum $V_{SUM}$ being greater than the off threshold voltage $V_{TH.off}$ and de-asserts the SR off signal SR_off in response to the voltage sum $V_{SUM}$ being less than the off threshold voltage $V_{TH.off}$. In an embodiment, the second comparator 308 includes hysteresis to prevent oscillation of the SR off signal SR_off when the voltage sum $V_{SUM}$ is substantially equal to the off threshold voltage $V_{TH.off}$.

The operation of the summing circuit 304 and the second comparator 308 is equivalent to comparing the drain voltage $V_D$ to a virtual off threshold $V_{VTH.off}$, wherein the virtual off threshold $V_{VTH.off}$ is equal to the off threshold voltage $V_{TH.off}$ minus the offset voltage $V_{offset}$. The second comparator 308 asserts the SR off signal SR_off in response to the drain voltage $V_D$ being greater than the virtual off threshold voltage $V_{VTH.off}$ and de-asserts the SR off signal SR_off in response to the drain voltage $V_D$ being less than the virtual off threshold voltage $V_{VTH.off}$.

The AND gate 307 receives the SR on signal SR_on and a negated SR conduction signal SR_COND_N. The AND gate 307 generates an output that is coupled to the set input S of the first SRFF 310. The output of the AND gate 307 is asserted when the SR on signal SR_on is asserted and the negated SR conduction signal SR_COND_N is asserted, and otherwise is de-asserted.

The first SRFF 310 sets a gate signal $V_{GS}$ to an asserted (e.g., high) value in response to the SR on signal SR_on being asserted while the negated SR conduction signal SR_COND_N is asserted. The first SRFF 310 resets the gate signal $V_{GS}$ in response to the SR off signal SR_off being asserted. When neither of these conditions is true, the first SRFF 310 maintains the gate signal $V_{GS}$ in its current state.

The operation of the summing circuit 304, first and second comparators 306 and 308, and first SRFF 310 may be summarized as:

$$V_{VTH.off} = V_{TH.off} - V_{offset} \quad \text{Equation 2}$$

$$V_D < V_{TH.on} \text{ and SR\_COND\_N asserted} \rightarrow \text{set } V_{GS} \quad \text{Equation 3}$$

$$V_D > V_{VTH.off} \rightarrow \text{reset } V_{GS} \quad \text{Equation 4}$$

The SR driver 312 receives the gate signal $V_{GS}$ and generates the gate control signal G. In an embodiment, the SR driver 312 may generate the gate control signal G by delaying a rising edge of the gate signal $V_{GS}$ in order to provide a guaranteed off time of the SR switching device being controlled by the gate control signal G. In other words, the SR driver 312 may provide a turn on delay when generating the gate control signal G.

The third comparator 316 receives the drain voltage $V_D$ and an SR off detection threshold $V_{HGH}$, and generates an off detection signal OFF_DET. The off detection signal OFF_DET may be used to indicate that the SR switching device being controlled by the SR controller 320 is not conducting current. The third comparator 316 asserts the off detection signal OFF_DET when the drain voltage $V_D$ is greater than the SR off detection threshold $V_{HGH}$, and de-asserts the off detection signal OFF_DET when the drain voltage $V_D$ is less than the SR off detection threshold $V_{HGH}$. Note that at least because current may flow through the body diode of the SR switching device, turning off the SR switching device does not guarantee that current is not flowing through the SR switching device.

In an embodiment, the third comparator 316 includes hysteresis to prevent oscillation of the off detection signal OFF_DET when the drain voltage $V_D$ is substantially equal to the SR off detection threshold $V_{HGH}$. In an embodiment, the SR off detection threshold $V_{HGH}$ is greater (more positive) than the virtual off threshold voltage $V_{VTH.off}$.

The second SRFF 318 receives the gate signal $V_{GS}$ and the off detection signal OFF_DET and generates a negated SR conduction signal SR_COND_N. The second SRFF 318 sets the negated SR conduction signal SR_COND_N to an asserted value in response to the off detection signal OFF_DET being asserted. The second SRFF 318 resets the negated SR conduction signal SR_COND_N in response to the gate signal $V_{GS}$ being asserted. When neither the off detection signal OFF_DET nor the gate signal $V_{GS}$ are asserted, the first SRFF 310 maintains the negated SR conduction signal SR_COND_N in its current state.

Accordingly, the negated SR conduction signal SR_COND_N is de-asserted during each of time periods beginning at an assertion of the gate signal $V_{GS}$ and ending at an assertion of the off detection signal OFF_DET, and is asserted between such periods.

The offset voltage controller 302 receives the gate signal $V_{GS}$, the negated SR conduction signal SR_COND_N, and an offset reset signal I_MOD_RST. Using those signals, the offset controller 302 generates the offset voltage $V_{offset}$, a high saturation signal H_SAT indicating that an internal count of the offset voltage controller 302 used to generate the offset voltage $V_{offset}$ has hit a maximum value, and a low saturation signal L_SAT indicating that the internal count of the offset voltage controller 302 has hit a minimum value. The offset voltage controller 302 is described with respect to FIG. 4, below.

The off threshold controller 314 receives the negated SR conduction signal SR_COND_N, the high saturation signal H_SAT, and the low saturation signal L_SAT. Using those signals, the off threshold controller 314 generates the off threshold voltage $V_{TH.off}$ and the offset reset signal I_MOD_RST that indicates that the offset voltage controller 302 should reset the offset voltage $V_{offset}$. The off threshold controller 314 is described with respect to FIG. 5, below.

Figure 3B:
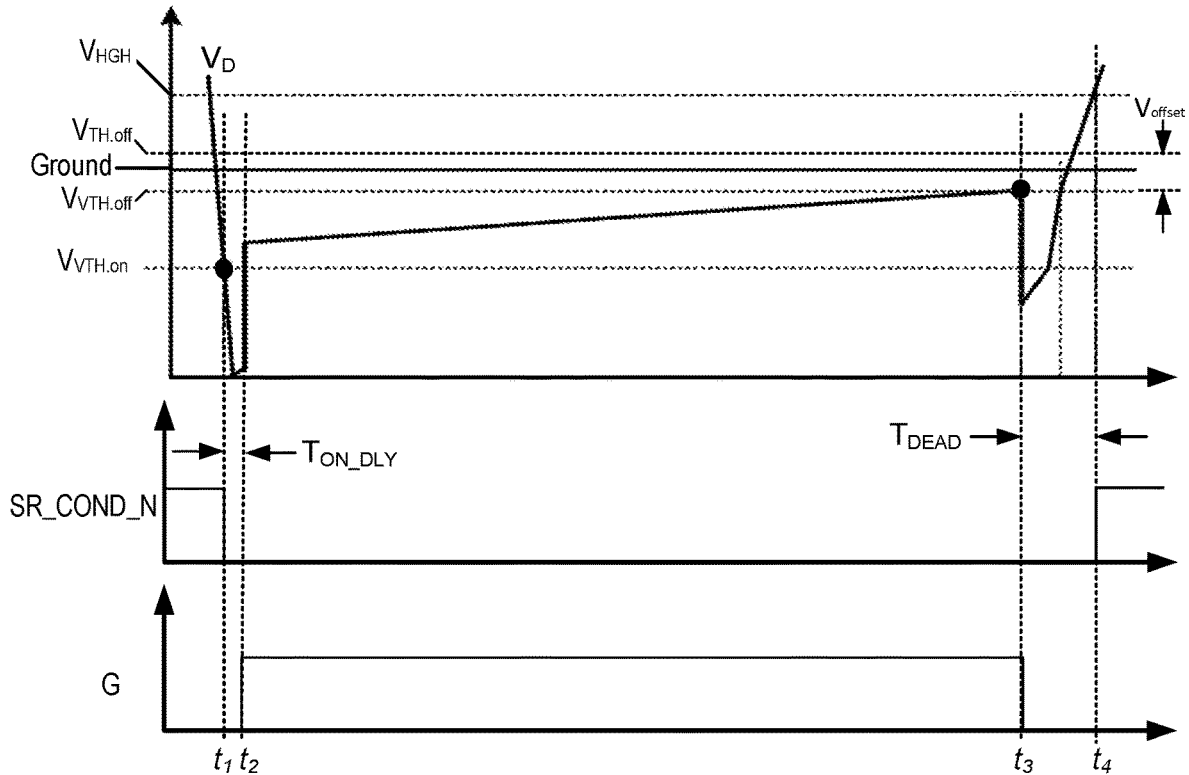
FIG. 3B includes waveforms illustrating operation of the SR controller of FIG. 3A according to an embodiment.

FIG. 3B includes waveforms illustrating operation during a period when the virtual off threshold $V_{VTH.off}$ is held constant of the SR controller 320 of FIG. 3A according to an embodiment. FIG. 3B includes waveforms of the drain voltage $V_D$, the gate control signal G and the negated SR conduction signal SR_COND_N.

Before a first time $t_1$, a secondary side current conducts through a body diode of an SR switching device (e.g., the SR switching device 122 of FIG. 1A) being controlled by the SR controller 320. As a result, the drain voltage $V_D$ of the SR switching device decreases until the drain voltage $V_D$ reaches the on threshold voltage $V_{TH.on}$.

At the first time $t_1$, the drain voltage $V_D$ dropping below the on threshold voltage $V_{TH.on}$ during a period when the negated SR conduction signal SR_COND_N is asserted causes the gate signal $V_{GS}$ of FIG. 3A to be asserted. The gate signal $V_{GS}$ being asserted causes the negated SR conduction signal SR_COND_N to be de-asserted, and after a turn-on delay $T_{ON\_DLY}$ provided the SR driver 312, causes the gate control signal G to be asserted at a second time $t_2$, turning on the SR switching device. Turning on the SR switching device lowers the resistance of the SR switching device, causing the absolute magnitude of the drain voltage $V_D$ to decrease which, since the drain voltage $V_D$ is a negative voltage, causes the value of the drain voltage $V_D$ to increase.

As the current through the SR switching device decreases, the absolute magnitude of the drain voltage $V_D$ decreases proportionally, and the value of the drain voltage $V_D$ further increases.

At a time $t_3$, the drain voltage $V_D$ reaches and exceeds the virtual off threshold voltage $V_{VTH.off}$. The drain voltage $V_D$ rising above the virtual off threshold voltage $V_{VTH.off}$ causes the gate signal $V_{GS}$ of FIG. 3A to be de-asserted, which causes the gate control signal G to be de-asserted without delay, turning off the SR switching device.

Turning off the SR switching device causes the current flowing through the SR switching device to flow through the body diode thereof, and thus through a higher resistance than when the SR switching device is turned on. As a result the absolute magnitude of the drain voltage $V_D$ increases which causes the value of the drain voltage $V_D$ to decrease below the on threshold voltage $V_{TH.on}$. However, because the negated SR conduction signal SR_COND_N is still de-asserted, the gate signal $V_{GS}$ is not asserted, and as a result the gate control signal G is not asserted and the SR switching device is not turned on.

At a fourth time $t_4$, the drain voltage $V_D$ reaches the SR off detection threshold $V_{HGH}$, and as a result the negated SR conduction signal SR_COND_N is asserted. At some time after the negated SR conduction signal SR_COND_N is asserted, the SR switching device can again be turned on when the drain voltage $V_D$ drops below the on threshold voltage $V_{TH.on}$. The period between the third time $t_3$ and the fourth time $t_4$ is a dead time interval $T_{DEAD}$ wherein spurious turning on of the SR switching device by transients in the drain voltage $V_D$ is prevented.

During a time interval between the second time $t_2$ and the third time $t_3$, a stray inductance of the switching device induces a positive voltage offset across the drain voltage $V_D$ when a secondary side current flowing through the SR switching device decreases. Such a positive voltage offset may increase the drain voltage $V_D$, leading to a premature turn-off of the switching device. When the switching device is turned off prematurely, the secondary side current may flow through the body diode of the switching device instead of through a channel of the switching device, which decreases the efficiency of the SR circuit due to the higher voltage drop of the body diode (that is, the higher resistance) compared to the channel.

In order to keep the dead time interval $T_{DEAD}$ between the third time $t_3$ and the fourth time $t_4$ substantially equal to a target dead time interval, the SR controller 320 adjusts magnitudes of the offset voltage $V_{offset}$ and the off threshold voltage VTH.off, resulting in a change in the virtual off threshold voltage $V_{VTH.off}$. This is explained with respect to FIGS. 4 and 5, below.

In addition, a decreasing rate of the secondary side current in a low load condition may be less than that in a high load condition, and thus a positive voltage offset due to the stray inductance in the low load condition is less than that in the high load condition. As a result, the drain voltage $V_D$ in the low load condition reaches the virtual turn-off threshold voltage $V_{VTH.off}$ at a time later than the drain voltage $V_D$ reaches the same level in the high load condition. Because the dead time interval $T_{DEAD}$ between the third time $t_3$ and the fourth time $t_4$ in the low load condition is less than that in the high load condition, the dead time interval $T_{DEAD}$ in the low load condition is more likely to be less than the target dead time interval than that in the high load condition.

Figure 4:
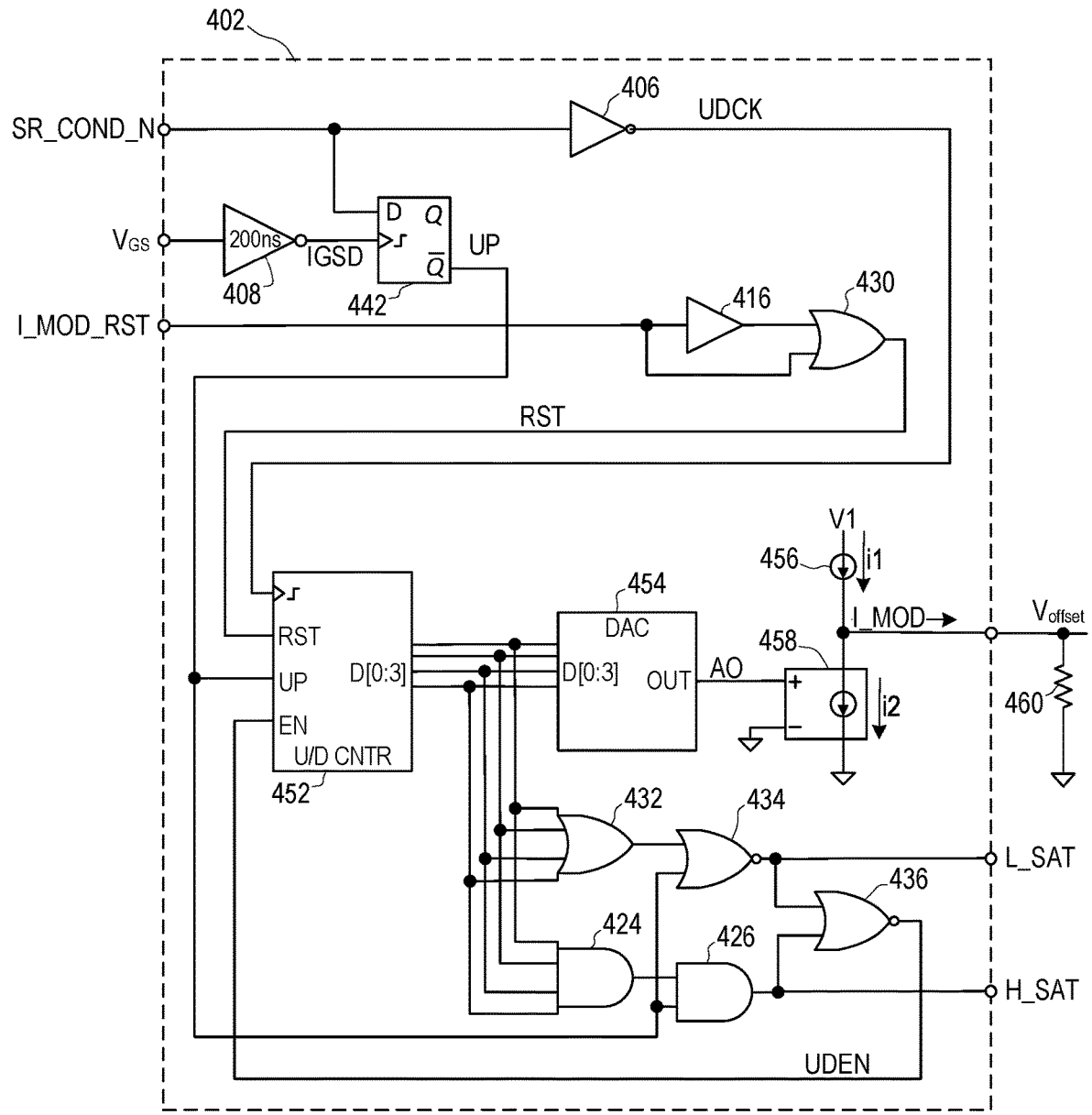
FIG. 4 illustrates an offset voltage controller suitable for use in an SR controller according to an embodiment.

FIG. 4 illustrates an offset voltage controller 402 suitable for use as the offset voltage controller 302 of the SR controller 320 of FIG. 3A according to an embodiment. The offset voltage controller 402 receives the negated SR conduction signal SR_COND_N, the gate signal $V_{GS}$, and the offset reset signal I_MOD_RST. The offset voltage controller 402 uses those signals to produce an offset voltage $V_{offset}$, a low saturation signal L_SAT, and a high saturation signal H_SAT.

The offset voltage controller 402 includes first and second inverters 406 and 408; a buffer 416; first and second AND gates 424 and 426; first and second OR gates 430 and 432; first and second NOR gates 434 and 436; and a D-type flip-flop (DFF) 442. The offset voltage controller 402 further includes an up-down counter 452 having 4 bits, a Digital-to-Analog Convert (DAC) 454, a current source 456, and a programmable current source 458. Also shown is an offset resistor 460, which in an embodiment is an external resistor not included in the SR controller that the offset voltage controller 402 is included in. FIG. 4 shows a terminal of the offset resistor 460 connected to ground, but embodiments are not limited thereto.

The first inverter 406 receives the negated SR conduction signal SR_COND_N and inverts it to generate an up-down clock UDCK. The first OR gate 430 asserts a reset signal RST when the offset reset signal I_MOD_RST is asserted, and de-asserts the reset signal RST a short delay interval after the offset reset signal I_MOD_RST is de-asserted, the short delay interval corresponding to a delay through the buffer 416.

The gate signal $V_{GS}$ being asserted at a rising edge of the negated SR conduction signal SR_COND_N may indicate that the SR switching device was on for the entire phase of the output of a corresponding transformer secondary coil.

A data input D of the DFF 442 receives the negated SR conduction signal SR_COND_N. A positive-edge triggered clock input of the DFF 442 receives an inverted delayed gate signal IGSD produced by the second inverter 408. In an embodiment, the second inverter 408 delays the gate signal $V_{GS}$ by, for example, 200 nanoseconds and inverts it to produce the inverted delayed gate signal IGSD. In an embodiment, the delay introduced by the second inverter 408 corresponds to a target value for the dead time interval $T_{DEAD}$.

The DFF 442 produces a count up signal UP by latching the negated SR conduction signal SR_COND_N on a rising edge of the inverted delayed gate signal IGSD and inverting the latched value. The rising edge of the inverted delayed gate signal IGSD corresponds to a falling edge of the gate signal $V_{GS}$ that occurred 200 nanoseconds before it. The second inverter 408 and DFF 442 comprise a dead time evaluation circuit to determine whether a measured dead time is less than a target dead time, the target dead time corresponding to the delay of the second inverter 408.

Accordingly, the count up signal UP will have be set to an asserted (UP) value if the negated SR conduction signal SR_COND_N has the de-asserted state 200 nanoseconds after a falling edge of the gate signal $V_{GS}$, that is, if the drain voltage $V_D$ has not reached the SR off detection threshold $V_{HGH}$ within 200 nanoseconds of the gate signal $V_{GS}$ being de-asserted, and will be set to the de-asserted (DOWN) value if the drain voltage $V_D$ reached the SR off detection threshold $V_{HGH}$ no later than 200 nanoseconds after the gate signal $V_{GS}$ was de-asserted.

The count up signal UP having the UP value indicates that the dead time interval $T_{DEAD}$ may need to be decreased. The dead time interval $T_{DEAD}$ may be decreased by increasing the virtual off threshold voltage $V_{VTH.off}$. The virtual off threshold voltage $V_{VTH.off}$ may be increased by decreasing the offset voltage $V_{offset}$ or by increasing the off threshold voltage $V_{TH.off}$.

The count up signal UP having the DOWN value indicates that the dead time interval $T_{DEAD}$ may need to be increased. The dead time interval $T_{DEAD}$ may be increased by decreasing the virtual off threshold voltage $V_{VTH.off}$. The virtual off threshold voltage $V_{VTH.off}$ may be decreased by increasing the offset voltage $V_{offset}$ or by decreasing the off threshold voltage $V_{TH.off}$.

Regarding the up-down counter 452, a positive-edge triggered clock input of the up-down counter 452 receives the up-down clock UDCK, a reset input RST of the up-down counter 452 receives the reset signal RST, an UP input of the up-down counter 452 receives the count up signal UP, and an enable input EN of the up-down counter 452 receives an up-down counter enable signal UDEN. The up-down counter 452 produce a 4-bit unsigned count D[0:3] according to the received signals.

When the reset signal RST is asserted, the up-down counter 452 outputs a value of 0 on the unsigned count D[0:3].

When the reset signal RST is de-asserted and the up-down counter enable signal UDEN is de-asserted, the up-down counter 452 maintains the output value of the unsigned count D[0:3] regardless of the values of the count up signal UP and the up-down clock UDCK.

When the reset signal RST is de-asserted, the up-down counter enable signal UDEN is asserted, the count up signal UP is asserted, and a rising edge occurs on the up-down clock UDCK, the up-down counter 452 increases the value output on the unsigned count D[0:3] by one.

When the reset signal RST is de-asserted, the up-down counter enable signal UDEN is asserted, the count up signal UP is de-asserted, and a rising edge occurs on the up-down clock UDCK, the up-down counter 452 decreases the value output on the unsigned count D[0:3] by one.

The DAC 454 receives the unsigned count D[0:3] and generates an analog output signal AO having a value corresponding to the unsigned count D[0:3]. The analog output signal AO is received by the programmable current source 458, which generates a second current $i_2$ proportional to the analog output signal AO. In an embodiment, the second current $i_2$ is:

$$i_2 = D[0:3] \times 5 \ \mu A \qquad \text{Equation 5}$$

A first current $i_1$ is generated by the current source 456 using an first internal voltage V1. The second current $i_2$ is combined with the first current $i_1$ provided by the current source 456 to produce a modulation current I_MOD:

$$\text{I\_MOD} = i_1 - i_2 = i_1 - (D[0:3] \times 5 \ \mu A) \qquad \text{Equation 6}$$

In an embodiment, the first current $i_1$ provided by the current source 456 is 75 μA, and the modulation current I_MOD ranges from 75 μA down to 0 μA as the unsigned count D[0:3] ranges from 0 to 15.

The modulation current I_MOD is provided to the offset resistor 460 to generate the offset voltage $V_{offset}$. With $R_{offset}$ representing the resistance of the offset resistor 460, the offset voltage $V_{offset}$ has a value equal to:

$$V_{offset} = \text{I\_MOD} \times R_{offset} \qquad \text{Equation 7}$$

The second OR gate 432 produces an output that is de-asserted when the unsigned count D[0:3] is zero (that is, when every bit of D[0:3] is zero) and asserted otherwise. The first NOR gate 434 combines the output of the second OR gate 432 with the count up signal UP to produce a low saturation signal L_SAT that is asserted when the unsigned count D[0:3] is zero and the count up signal UP is de-asserted (that is, has a DOWN value), and de-asserted otherwise, thereby indicating saturation of the up-down counter 452 at the lower end of its range.

The first AND gate 424 produces an output that is asserted when the unsigned count D[0:3] is at a maximum value (that is, when every bit of D[0:3] is one) and de-asserted otherwise. The second AND gate 426 combines the output of the first AND gate 424 with the count up signal UP to produce a high saturation signal H_SAT that is asserted when the unsigned count D[0:3] is at its maximum value and the count up signal UP is asserted (that is, has an UP value), and de-asserted otherwise, thereby indicating saturation of the up-down counter 452 at the upper end of its range.

The second NOR gate 436 combines the high saturation signal H_SAT and the low saturation signal L_SAT to produce an up-down counter enable signal UDEN. The up-down counter enable signal UDEN is de-asserted when either of the high saturation signal H_SAT and the low saturation signal L_SAT are asserted. The up-down counter enable signal UDEN is provided to the enable input EN of the up-down counter 452, and operates to prevent the up-down counter 452 from incrementing or decrementing beyond either the minimum or maximum value of the unsigned count D[0:3]. That is, the up-down counter enable signal UDEN prevents the up-down counter 452 from "wrapping around" from the maximum to the minimum value or vice versa.

Figure 5:
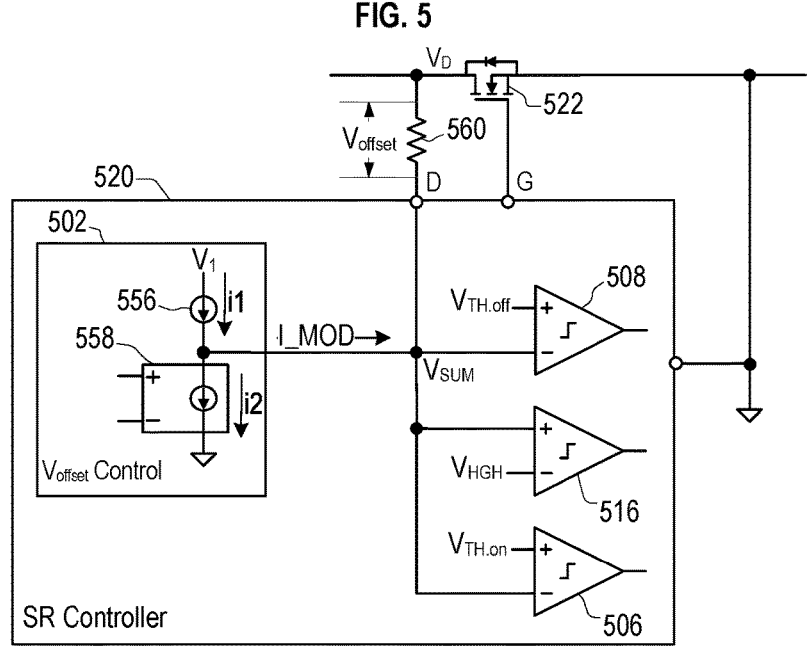
FIG. 5 illustrates a circuit for generating an offset voltage for an SR controller according to an embodiment.

FIG. 5 illustrates a circuit for generating an offset voltage $V_{offset}$ for an SR controller 520 according to an embodiment. The SR controller 520 may be the SR controller 320 of FIG. 3, wherein first second, and third comparators 506, 508, and 516 correspond to the first, second, and third comparators 306, 308 and 316 of the SR controller 320 and an offset voltage controller 502 corresponds to the offset voltage controller 402 of FIG. 4. The SR controller 520 controls an SR switching device 522 corresponding to the SR switching device 122 of FIG. 1A. Portions of the SR controller 520 are omitted in the interest of clarity.

An offset resistor 560, corresponding to the offset resistor 460 of FIG. 4, is coupled between a drain terminal of the SR switching device 522 and a drain input D of the SR controller 520. An output of the offset voltage controller 502 is also coupled to the drain input D. When the body diode of the SR switching device 522 is conducting, the voltage at the drain input D is near zero. So, the drain input D corresponds roughly to the ground terminal coupled to the offset resistor 460 in FIG. 4.

The offset voltage controller 502 includes a current source 556 and a programmable current source 558 corresponding to the current source 456 and the programmable current source 458 of FIG. 4. Using the current source 556 and the programmable current source 558, the offset voltage controller 502 generates the modulation current I_MOD using a first internal voltage $V_1$.

When the drain voltage $V_D$ at the drain terminal of the SR switching device 522 is less than the first internal voltage $V_1$ of FIG. 4, because the comparators 506, 508, and 516 have very high input impedances, the modulation current I_MOD generated by the offset voltage controller 502 flows through the offset resistor 560, generating the offset voltage $V_{offset}$ across the offset resistor 560. As a result, when the drain voltage $V_D$ at the drain terminal of the SR switching device 522 is less than the first internal voltage $V_1$, the voltage sum $V_{SUM}$ is equal to the sum of the drain voltage $V_D$ and an offset voltage $V_{offset}$ equal to the modulation current I_MOD times the resistance of the offset resistor 560.

When the drain voltage $V_D$ at the drain terminal of the SR switching device 522 is greater than or equal to the first internal voltage $V_1$, the offset voltage controller 502 may not produce the modulation current I_MOD. As a result, when the drain voltage $V_D$ at the drain terminal of the SR switching device 522 is greater than or equal to the first internal voltage $V_1$, the voltage sum $V_{SUM}$ is equal to the drain voltage $V_D$.

In an embodiment, a switching device in the offset voltage controller 502 (not shown) is controlled by a gate signal (such as the gate signal $V_{GS}$ of FIG. 3) so that the modulation current I_MOD is turned off when the SR switching device 522 is tuned off. As a result, the modulation current I_MOD does not alter the effective values of the on threshold voltage $V_{TH.on}$ and the SR off detection threshold $V_{HGH}$.

In FIG. 5, the coupling of the offset resistor 560 between the drain terminal of the SR switching device and the drain input D of the SR controller operates to provide the functionality of both the offset resistor 460 of FIG. 4 and the summing circuit 304 of FIG. 3.

Figure 6:
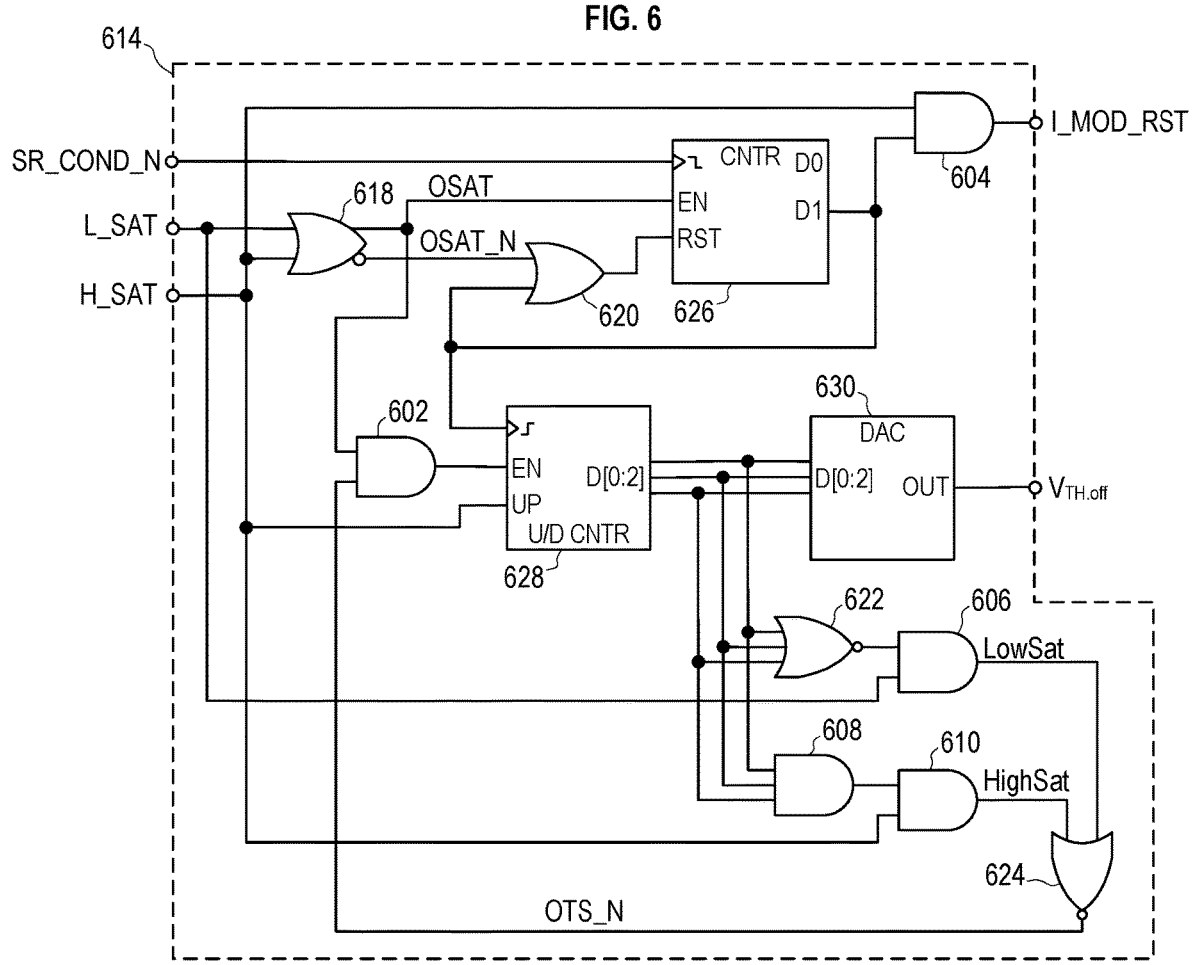
FIG. 6 illustrates an off threshold controller suitable for use in an SR controller according to an embodiment.

FIG. 6 illustrates an off threshold controller 614 suitable for use as off threshold controller 314 of the SR controller 320 of FIG. 3 according to an embodiment. The off threshold controller 614 receives a negated SR conduction signal SR_COND_N, a low saturation signal L_SAT, and a high saturation signal H_SAT. Using these signals, the off threshold controller 614 generates an off threshold voltage $V_{TH.off}$ and an offset reset signal I_MOD_RST.

The off threshold controller 614 includes first, second, third, fourth and fifth AND gates 602, 604, 606, 608, and 610; a complementary-output OR gate 618; an OR gate 620, and first and second NOR gates 622 and 624. The off threshold controller 614 further includes a 2-bit counter 626, a 3-bit up-down counter 628, and a Digital-to-Analog Converter (DAC) 630.

The complementary-output OR gate 618 receives the low saturation signal L_SAT and high saturation signal H_SAT. The complementary-output OR gate 618 asserts an offset saturated signal OSAT when either of the low saturation signal L_SAT and the high saturation signal H_SAT are asserted, and de-asserts the offset saturation signal SAT otherwise. The complementary-output OR gate 618 asserts an offset not saturated signal OSAT_N when neither of the low saturation signal L_SAT and the high saturation signal H_SAT are asserted, and de-asserts the offset not saturated signal OSAT_N otherwise.

An enabled input EN of the counter 626 receives the offset saturated signal OSAT. When the offset saturated signal OSAT is asserted and a reset input RST of the counter 626 is not asserted, the counter 626 is incremented in response to a falling edge of the negated SR conduction signal SR_COND_N. When the counter 626 reaches a count of two, a second bit D1 of the counter 626 is asserted.

The second AND gate 604 receives the second bit D1 of the counter 626 and the high saturation signal H_SAT. When both the second bit D1 and the high saturation signal H_SAT are asserted, the second AND gate 604 asserts the offset reset signal I_MOD_RST; otherwise, the second AND gate 604 de-asserts the offset reset signal I_MOD_RST. As a result, the offset reset signal I_MOD_RST is asserted when the high saturation signal H_SAT has been asserted for two consecutive negative transitions of the negated SR conduction signal SR_COND_N; that is, for two consecutive cycles of synchronous rectification.

The OR gate 620 receives the offset not saturated signal OSAT_N and the second bit D1 of the counter 626, and produces an output that is coupled to the reset input RST of the counter 626. As a result, the counter 626 is reset when either of the not saturated signal OSAT_N and the second bit D1 are asserted.

The first AND gate 602 receives the offset saturated signal OSAT and an off threshold not saturated signal OTS_N and generates a signal that is coupled to the enable signal EN of the up-down counter 628. As a result, the up-down counter 628 is enabled when the offset saturated signal OSAT is asserted and the off threshold not saturated signal OTS_N is asserted.

A positive-edge triggered clock input of the up-down counter 628 receives the second bit D1 of the counter 626. The up-down counter 628 therefore counts, either increasing or decreasing a value of an unsigned count D[0:2] of the up-down counter 628, when the up-down counter 628 is enabled and the counter 626 is counts to two. When the up-down counter 628 counts, it increases the value of the unsigned count D[0:2] when the high saturation signal H_SAT is asserted and decreases the value of the unsigned count D[0:2] when the high saturation signal H_SAT is not asserted.

The DAC 630 receives the unsigned count D[0:2] and generates the off threshold voltage $V_{TH.off}$ have a value corresponding to the unsigned count D[0:2]. In an embodiment, the off threshold voltage $V_{TH.off}$ has a range of 0 to 70 millivolts corresponding to a range of the unsigned count D[0:2] of 0 to 7, respectively.

The second NOR gate 622 produces an output that is asserted when the unsigned count D[0:2] is zero (that is, when every bit of the unsigned count D[0:2] is zero) and de-asserted otherwise. The third AND gate 606 combines the output of the second NOR gate 622 with the low saturation signal L_SAT to produce a low threshold saturation signal LowSat that is asserted when the unsigned count D[0:2] is zero and the low saturation signal L_SAT is asserted, and de-asserted otherwise, thereby indicating saturation of the up-down counter 628 at the bottom end of its range.

The fourth AND gate 608 produces an output that is asserted when the unsigned count D[0:2] is at a maximum value (that is, when every bit of the unsigned count D[0:2] is one) and de-asserted otherwise. The fifth AND gate 610 combines the output of the fourth AND gate 608 with the high saturation signal H_SAT to produce a high threshold saturation signal HighSat that is asserted when the unsigned count D[0:2] is at its maximum value and the high saturation signal H_SAT is asserted, and de-asserted otherwise, thereby indicating saturation of the up-down counter 628 at the top end of its range.

The second NOR gate 624 combines the high threshold saturation signal HighSat and the low threshold saturation signal LowSat to produce the off threshold not saturated signal OTS_N. The off threshold not saturated signal OTS_N is de-asserted when either of the high threshold saturation signal HighSat and the low threshold saturation signal LowSat are asserted. The off threshold not saturated signal OTS_N is used to generate the enable signal for the up-down counter 628, and operates to prevent the up-down counter 628 from incrementing or decrementing beyond either the minimum or maximum value of the unsigned count D[0:2]. That is, the off threshold not saturated signal OTS_N prevents the up-down counter 628 from "wrapping around" from its maximum to its minimum value or vice versa.

Figure 7:
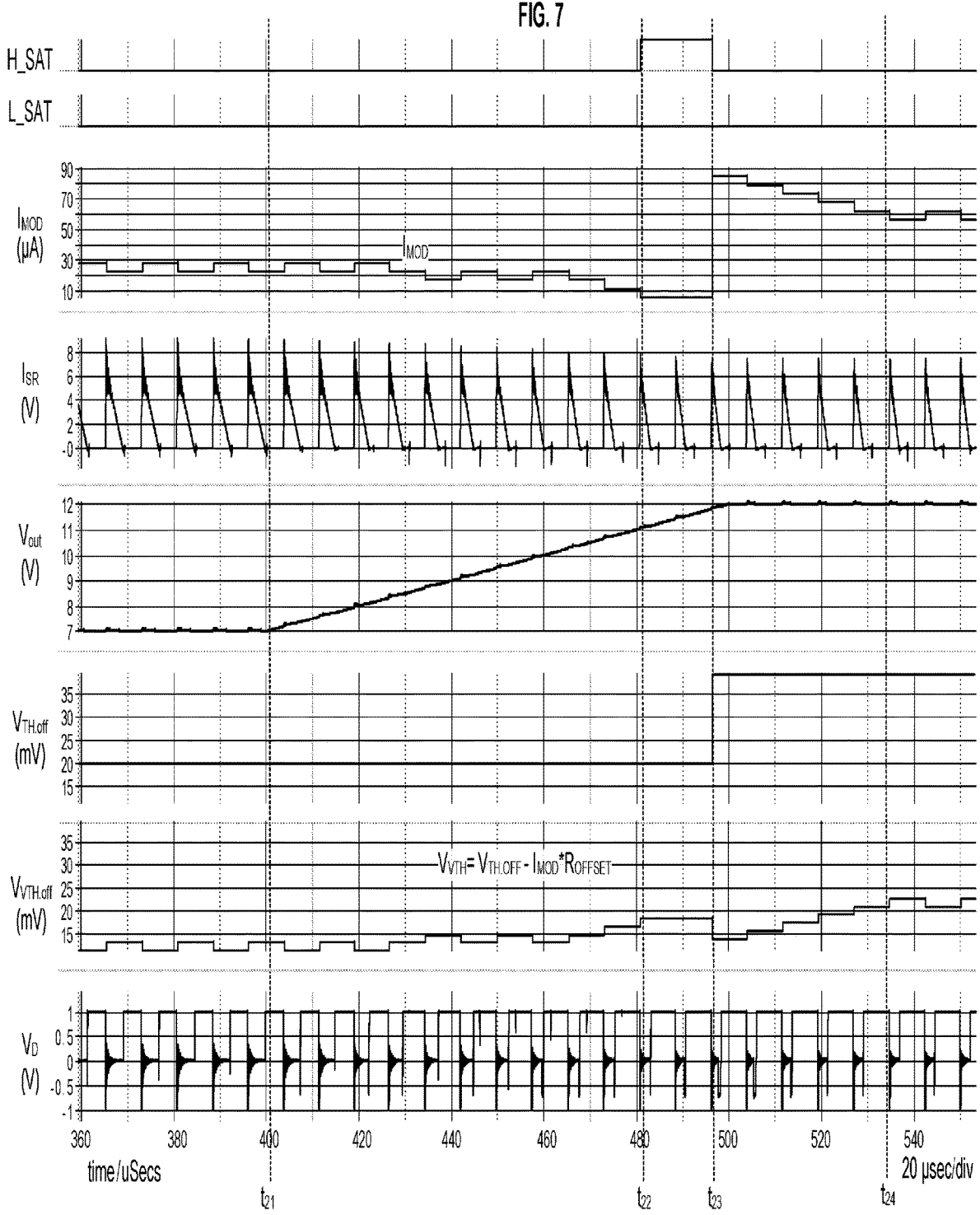
FIG. 7 includes waveforms illustrating operation of an SR controller according to an embodiment when an output voltage is increasing FIG. 8 includes waveforms illustrating operation of an SR controller according to an embodiment when an output voltage is decreasing.

FIG. 7 includes waveforms illustrating operation of an SR controller according to an embodiment when an output voltage produced using the SR controller is increasing. FIG. 7 includes waveforms for a high saturation signal H_SAT, a low saturation signal L_SAT, an off threshold voltage $V_{TH.off}$, and a drain voltage $V_D$, each corresponding to the like-named signals in FIG. 3A. FIG. 7 further includes waveforms for an output voltage $V_{out}$ (corresponding to the output voltage $V_{out}$ of FIG. 1A), an effective off threshold voltage $V_{VTH.off}$ (corresponding to the virtual off threshold voltage $V_{VTH.off}$ discussed herein) and a modulation current $I_{MOD}$ (corresponding to the modulation current I_MOD of FIG. 4).

In the interval before a first time $t_{21}$, a count in an offset voltage controller of the SR controller alternately increments and decrements, and as a result the modulation current $I_{MOD}$ has a relatively stable value of either 23 or 27 µA. The off threshold voltage $V_{TH.off}$ has a value of 20 mV, and as a result the effective off threshold voltage $V_{VTH.off}$ is about 20 mV-7 or 8 mV=12 or 13 mV.

At an interval between the first time $t_{21}$ and a second time $t_{22}$, the power converter in which the SR controller operates raises the output voltage $V_{out}$ from 7V to 11V. As a result, the rate of change $\partial I_{SR}/\partial t$ of the SR current $I_{SR}$ increases, causing a stray inductance of the SR circuit to increase an offset voltage being added to a drain voltage being measured by the SR controller. In response, the SR controller operates as described with respect to FIG. 7 by incrementing the count in the offset voltage controller to lower the modulation current $I_{MOD}$, which causes the effective off threshold voltage $V_{VTH.off}$ to increase in order to compensate for the effect of the stray inductance.

At the second time $t_{22}$, an upper limit to the count in the offset voltage controller, corresponding to a lower limit of the modulation current $I_{MOD}$, is reached. In an interval between second time $t_{22}$ and a third time $t_{23}$, the power convert in which the SR controller operates to further raise the output voltage $V_{out}$ from 11 V to 12 V.

At the third time $t_{23}$, in response to an indication that the effective off threshold voltage $V_{VTH.off}$ must be further increased, the SR controller increases the off threshold voltage $V_{TH.off}$ to 40 mV and resets the count, causing the modulation current $I_{MOD}$ to have its maximum possible value of around 90 µA. As a result, the effective off threshold voltage $V_{VTH.off}$ is about 40 mV-27 mV=13 mV.

In an interval between third time $t_{23}$ and a fourth time $t_{24}$, in response to the detected dead time being greater than the target dead time, the SR controller increments the count in the offset voltage controller to lower the modulation current $I_{MOD}$, which causes the effective off threshold voltage $V_{VTH.off}$ to increase in order to compensate for the effect of the stray inductance.

At the fourth time $t_{24}$, the effective off threshold voltage $V_{VTH.off}$ reaches a value sufficient to compensate for the effects of the stray inductance and stabilizes at 22 or 26 mV.

Figure 8:
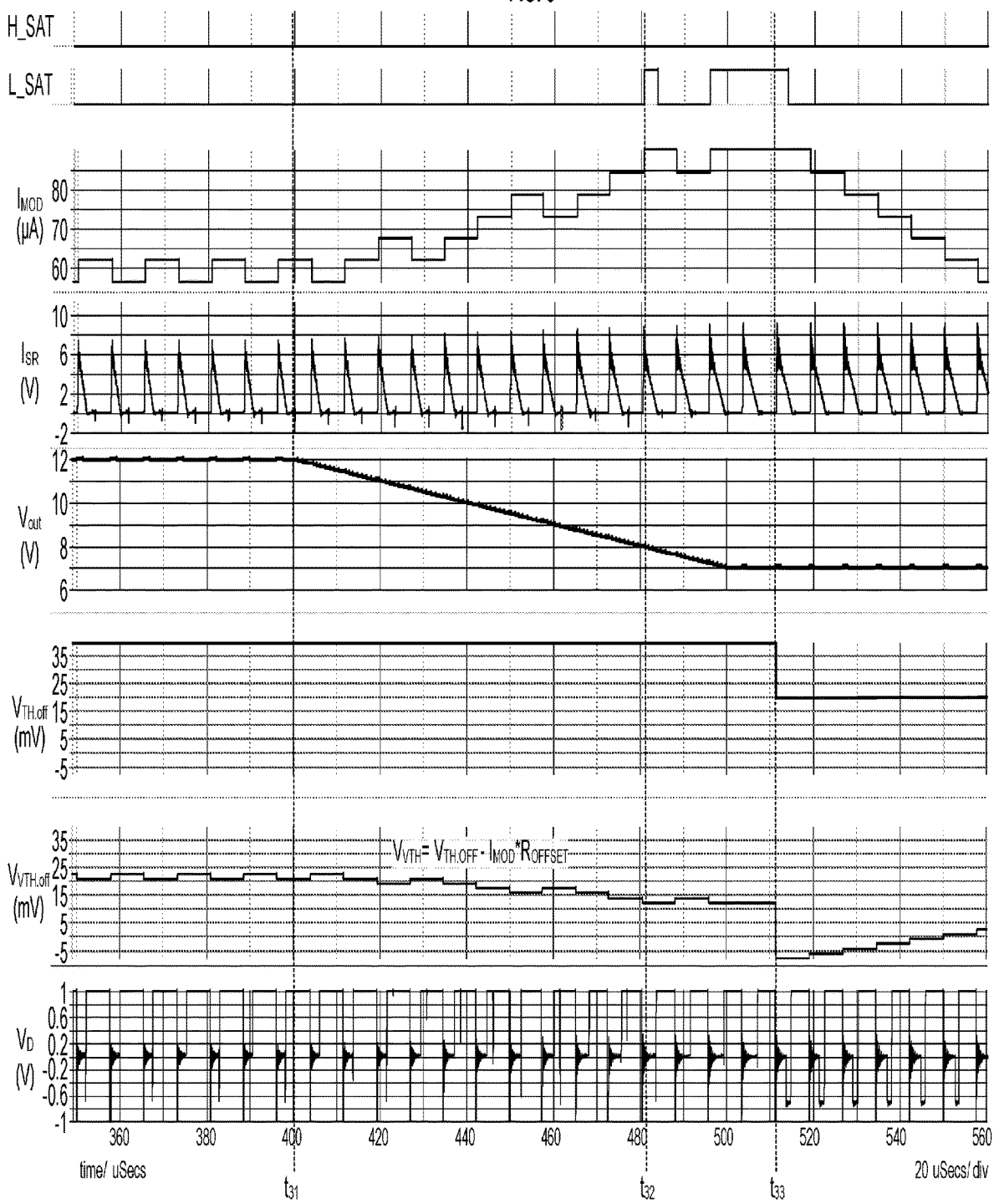

FIG. 8 includes waveforms illustrating operation of an SR controller according to an embodiment when an output voltage produced using the SR controller is decreasing. FIG. 8 includes waveforms for a high saturation signal H_SAT, a low saturation signal L_SAT, an off threshold voltage $V_{TH.off}$, and a drain voltage $V_D$, each corresponding to the like-named signals in FIG. 3A. FIG. 8 further includes waveforms for an output voltage $V_{out}$ (corresponding to the output voltage $V_{out}$ of FIG. 1A), an effective off threshold voltage $V_{VTH.off}$ (corresponding to the virtual off threshold voltage $V_{VTH.off}$ discussed herein) and a modulation current $I_{MOD}$ (corresponding to the modulation current I_MOD of FIG. 4).

In the interval before a first time $t_{31}$, a count in an offset voltage controller of the SR controller alternately increments and decrements, and as a result the modulation current $I_{MOD}$ has a relatively stable value of either 57 or 62 µA. The off threshold voltage $V_{TH.off}$ has a value of 40 mV, and as a result the effective off threshold voltage $V_{VTH.off}$ is about 40 mV-17 or 18.5 mV=23 or 21.5 mV.

During an interval between first time $t_{31}$ and a second time $t_{32}$, the power converter in which the SR controller operates lowers the output voltage $V_{out}$ from 12V to 8V. As a result the rate of change $\partial I_{SR}/\partial t$ of the SR current $I_{SR}$ decreases, causing a stray inductance of the SR circuit to decrease an offset voltage being added to a drain voltage being measured by the SR controller. In response, the SR controller operates as described with respect to FIG. 7 by decreasing a count in the offset voltage controller to raise the modulation current $I_{MOD}$, which causes the effective off threshold voltage $V_{VTH.off}$ to decrease in order to compensate for the decrease in the effect of the stray inductance.

At the second time $t_{32}$, a lower limit to the count in the offset voltage controller, corresponding to an upper limit of the modulation current $I_{MOD}$, is reached. In an interval between second time $t_{32}$ and a third time $t_{33}$, the power convert in which the SR controller operates to further raise the output voltage $V_{out}$ from 11 V to 12 V. However, no determination to further decrease the effective off threshold voltage $V_{VTH.off}$ occurs in the interval between the second time $t_{32}$ and a third time $t_{33}$.

At the third time $t_{33}$, in response to a determination that the effective off threshold voltage $V_{VTH.off}$ is to be further decreased and the modulation current $I_{MOD}$ being at its upper limit, the SR controller decreases the off threshold voltage VTH.off to 20 mV. The modulation current $I_{MOD}$ remains unchanged. As a result, the effective off threshold voltage $V_{VTH.off}$ is about 20 mV-27 mV=-7 mV.

In an interval after the third time $t_{33}$, in response to the detected dead time being greater than the target dead time, the SR controller c increments the count in the offset voltage controller to lower the modulation current $I_{MOD}$, which causes the effective off threshold voltage $V_{VTH.off}$ to increase until a value is reached that compensates for the effect of the stray inductance.

Figure 9:
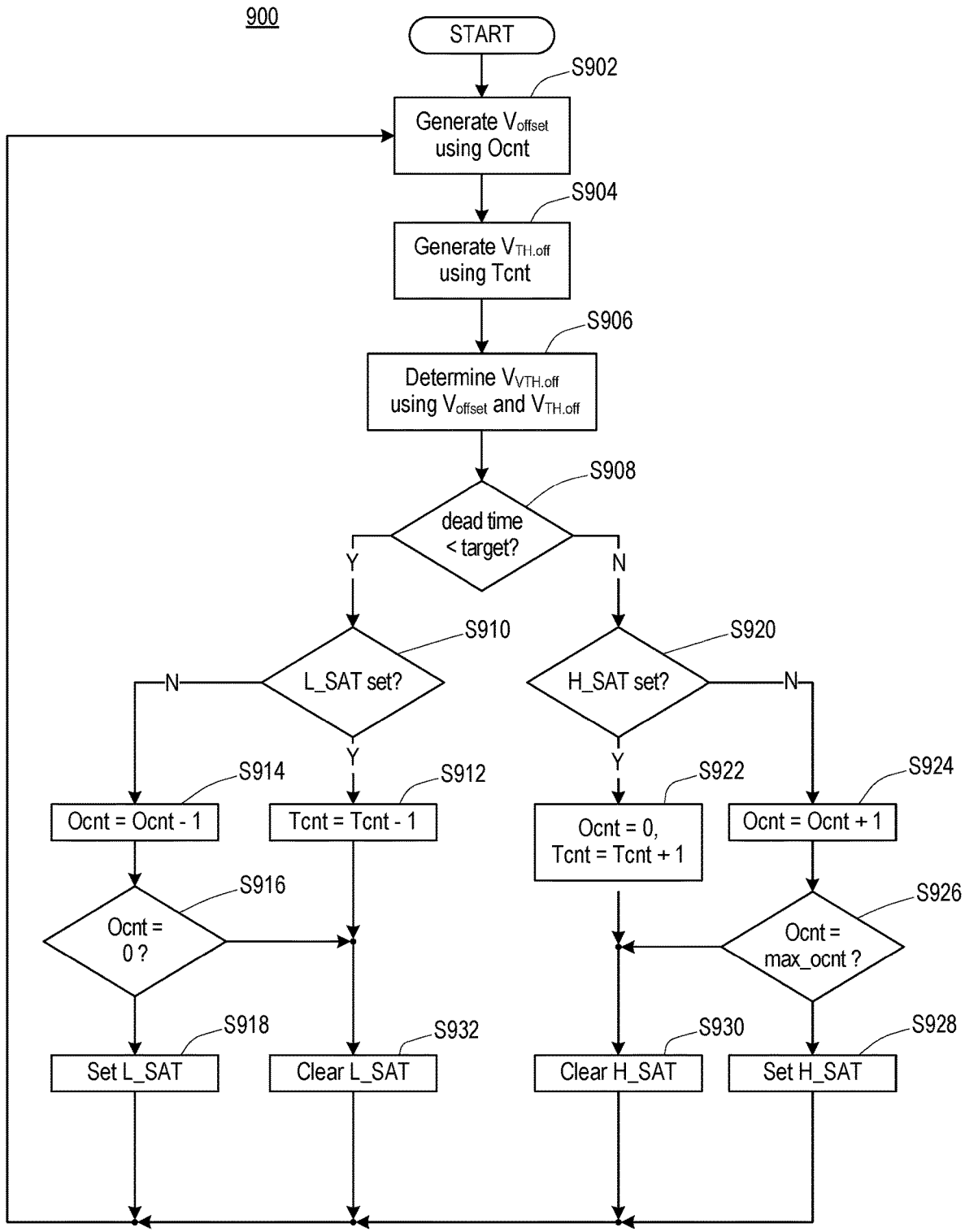
FIG. 9 illustrates a process for controlling a threshold voltage of a SR controller circuit according to an embodiment.

FIG. 9 illustrates a process 900 for controlling a threshold, such as a turn off threshold, of a Synchronous Rectifier (SR) controller circuit according to an embodiment. The process 900 may be used in an SR controller circuit such as the SR controller 320 of FIG. 3. In an embodiment, the process 900 is executed once for each cycle of rectification performed by the SR controller.

At S902, the process 900 generates an offset voltage $V_{offset}$ using an offset count Ocnt. In an embodiment, the offset count Ocnt is a 4-bit unsigned value.

In an embodiment, the offset voltage $V_{offset}$ may by generated by providing the offset count Ocnt to a first Digital to Analog Converter (DAC), generating a first current according to the output of the first DAC, subtracting the first current from a reference current to generate a modulation current, and providing the modulation current to an offset resistor.

At S904, the process 900 generates an off threshold voltage $V_{TH.off}$ using a threshold count Tcnt. In an embodiment, the threshold count Tcnt is a 3-bit unsigned value.

In an embodiment, the off threshold voltage $V_{TH.off}$ is generated by providing the threshold count Tcnt to a second DAC.

At S906, the process 900 determines a virtual off threshold voltage $V_{VTH.off}$ using the offset voltage $V_{offset}$ and the off threshold voltage $V_{TH.off}$.

In a first embodiment, the virtual off threshold voltage $V_{VTH.off}$ is determined by subtracting the offset voltage $V_{offset}$ from the off threshold voltage $V_{TH.off}$.

In a second embodiment, the virtual off threshold voltage $V_{VTH.off}$ is determined by adding the offset voltage $V_{offset}$ to a signal to be compared to the virtual off threshold voltage $V_{VTH.off}$, and then comparing the result of the addition to the off threshold voltage $V_{TH.off}$. The adding of the offset voltage $V_{offset}$ to the signal to be compared may be accomplished by coupling an offset resistor used to generate the offset voltage $V_{offset}$ between the signal to be compared and the comparator used to compare the result of the addition to the off threshold voltage $V_{TH.off}$.

In both the first and second embodiments, the virtual off threshold voltage $V_{VTH.off}$ is effectively equal to $V_{TH.off} - V_{offset}$.

At S908, the process 900 determines whether a measured dead time is less than a target dead time. In an embodiment, whether the measured dead time is less than the target dead time is determined by delaying a gate signal used to control an SR switching device by a duration corresponding to the target dead time and evaluating whether an indication of the SR switching device being on is asserted or not when the delayed gate signal is de-asserted.

When the measured dead time is less than the target dead time, the process 900 proceeds to S910. Otherwise, the process 900 proceeds to S920.

At S910, the process 900 determines whether a low saturation indication L_SAT is set. The low saturation indication L_SAT indicates that the offset count Ocnt is at its minimum possible value (i.e. 0) when set, and is cleared otherwise. In an embodiment, the offset count Ocnt being at its minimum possible value corresponds to the offset voltage $V_{offset}$ being at its maximum value.

At S910, when the low saturation indication L_SAT is set, the process 900 proceeds to S912; otherwise the process 900 proceeds to S914.

At S912, the process 900 decrements the threshold count Tcnt. In the embodiment of FIG. 9, the threshold count Tcnt is decremented by one, but embodiments are not limited thereto, and in other embodiments the threshold count Tcnt may be decremented by 2 or more. The process 900 then proceeds to S932. In an embodiment, at S912, the threshold count Tcnt may be decremented by two when a measured dead time is less than a lower limit value (e.g., 50 nanoseconds) during a load transition. In an embodiment, the process 900 does not alter the offset count Ocnt when decrementing the threshold count Tcnt.

At S914, the process 900 decrements the offset count Ocnt and proceeds to S916. In an embodiment, at S922 the offset count Ocnt may be decremented by two when a measured dead time is less than the lower limit value during a load transition.

At S916, the process 900 determines whether the offset count Ocnt is equal to a minimum value (i.e., 0). At S916, when the offset count Ocnt is equal to a minimum value, the process 100 proceeds to S918; otherwise, the process 900 proceeds to S932.

At S918, the process 900 sets the low saturation indication L_SAT and proceeds to S902.

At S920, the process 900 determines whether a high saturation indication H_SAT is set. The high saturation indication H_SAT indicates that the offset count Ocnt is at its maximum possible value (e.g. 15 when the offset count Ocnt is a 4-bit value) when set, and is cleared otherwise. In an embodiment, the offset count Ocnt being at its maximum possible value corresponds to the offset voltage $V_{offset}$ being at its minimum value.

At S920, when the high saturation indication H_SAT is set, the process 900 proceeds to S922; otherwise the process 900 proceeds to S924.

At S922, the process 900 increments the threshold count Tcnt and sets the offset count Ocnt to zero. In the embodiment of FIG. 9, the threshold count Tcnt is incremented by one, but embodiments are not limited thereto, and in other embodiments the threshold count Tcnt may be incremented by 2 or more. In an embodiment, at S922, the threshold count Tcnt may be incremented by two when a measured dead time is greater than an upper limit value during a load transition. The process 900 then proceeds to S930.

At S924, the process 900 increments the offset count Ocnt and proceeds to S926. In an embodiment, at S922, the offset count Ocnt may be incremented by two when a measured dead time is greater than the upper limit value during a load transition.

At S926, the process 900 determines whether the offset count Ocnt is equal to the maximum possible value (e.g., 15 when the offset count Ocnt is a 4-bit value). At S926, when the offset count Ocnt is equal to the maximum possible value, the process 100 proceeds to S928; otherwise, the process 900 proceeds to S930.

At S918, the process 900 sets the high saturation indication H_SAT and proceeds to S902.

At S930, the process 900 clears the high saturation indication H_SAT and proceeds to S902.

At S932, the process 900 clears the low saturation indication L_SAT and proceeds to S902.

Embodiments of the present disclosure include electronic devices configured to perform one or more of the operations described herein. However, embodiments are not limited thereto.

While illustrative embodiments have been disclosed to aid in the understanding of the disclosure, embodiments are not limited thereto, but are instead limited only by the scope of the appended claims. Embodiment may include various modifications and equivalent arrangements included within the scope of the appended claims. The order of operations described in embodiments is illustrative and may be re-ordered unless otherwise constrained. Further, features of two or more embodiments may be combined to form a new embodiment.

What is claimed is:

1. A controller circuit for controlling a switching device, the controller circuit comprising:
   a gate signal for controlling the switching device;
   a dead time evaluation circuit to determine an up indication indicating whether a measured dead time of the switching device is less than a target dead time, the measured dead time corresponding to a time between a de-assertion of the gate signal and a subsequent time at which asserting the gate signal is enabled;
   an offset voltage control circuit to determine, using the up indication, an offset voltage; and
   an off threshold control circuit to determine an off threshold voltage,
   wherein the controller circuit determines to turn off the switching device by compensating for a voltage difference caused by a stray inductance by controlling a virtual off threshold voltage according to whether the measured dead time of the switching device is less than the target dead time, and
   wherein the virtual off threshold voltage corresponds to a difference between the offset voltage and the off threshold voltage.

2. The controller circuit of claim 1, further comprising:
   a summing circuit to produce a sum signal corresponding to a sum of a voltage of a conduction terminal of the switching device and the offset voltage, and
   a comparator to assert a turn off signal in response to the sum signal having a value greater than the off threshold voltage,
   wherein the controller circuit, in response to the assertion of the turn off signal, de-asserts the gate signal to turn off the switching device.

3. The controller circuit of claim 1, wherein the off threshold control circuit increases the off threshold voltage in response to the offset voltage having a minimum value; and decreases the off threshold voltage in response to the offset voltage having a maximum value.

4. The controller circuit of claim 1, wherein the offset voltage control circuit sets the offset voltage to a maximum value of the offset voltage in response to increasing the off threshold voltage.

5. The controller circuit of claim 1, further comprising:
   an off threshold control circuit to increase an off threshold voltage in response to an offset voltage having a minimum value for two consecutive switching cycles of the switching device, and to decreasing the off threshold voltage in response to the offset voltage having a maximum value for two consecutive switching cycles of the switching device,
   wherein the virtual off threshold voltage corresponds to a difference between the offset voltage and the off threshold voltage.

6. The controller circuit of claim 1, further comprising:
   a comparator circuit to assert a turn off signal in response to a measured voltage of the switching device being greater than the virtual off threshold voltage, the measured voltage including the voltage difference caused by the stray inductance,
   wherein the controller circuit de-asserts the gate signal to turn off the switching device in response to the assertion of the turn off signal.

7. A controller circuit for controlling a switching device, the controller circuit comprising:
   a gate signal for controlling the switching device;
   an offset voltage control circuit to receive the gate signal and a conduction signal and to produce, using a dead time evaluation circuit, an offset voltage, a high saturation signal, and a low saturation signal;
   an off threshold control circuit to produce, using the conduction signal, the high saturation signal, and the low saturation signal, an off threshold voltage; and
   a comparator circuit to assert a turn-off signal in response to a voltage of the switching device being greater than a virtual turn off voltage,
   wherein the virtual off threshold voltage corresponds to a difference between the offset voltage and the off threshold voltage, and
   wherein the controller circuit de-asserts the gate signal to turn off the switching device in response to the assertion of the turn off signal.

8. The controller circuit of claim 7, wherein the offset voltage control circuit comprises:
   the dead time evaluation circuit to produce an up signal according to a value of the conduction signal at a time corresponding to a de-assertion of the gate signal and a predetermined delay time;
   an up-down counter to produce an offset count according to the up signal and the conduction signal;
   a Digital-to-Analog Converter circuit to produce the offset voltage according to the offset count;
   a high sat circuit to assert the high saturation signal in response to the offset count having a value equal to a predetermined maximum value; and
   a low sat circuit to assert the low saturation signal in response to the offset count having a value equal to a predetermined minimum value.

9. The controller circuit of claim 7, wherein the off threshold control circuit comprises:
   a clock circuit to produce a clock signal according to the conduction signal, the high saturation signal, and the low saturation signal;
   an up-down counter to produce a threshold count according to the clock signal and the high saturation signal; and
   a Digital-to-Analog Converter circuit to produce the off threshold voltage according to the threshold count.

10. The controller circuit of claim 9, wherein the clock circuit comprises:
    a saturation detection circuit to produce a saturation signal using a logical OR of the high saturation signal and the low saturation signal; and
    a counter circuit to produce the clock signal by counting assertions of the conduction signal when the saturation signal is asserted.

11. The controller circuit of claim 10, wherein the off threshold control circuit further comprises:
    a counter limit detect circuit to produce a counter limit indication signal; and
    a counter enable circuit to control whether the up-down counter is enabled using the counter limit indication signal and saturation signal, wherein the counter limit indication signal is to prevent the up-down counter from counting up when the up-down counter is at a predetermined maximum value, and prevent the up-down counter from counting down when the up-down counter is at a predetermined minimum value.

12. A method for controlling a switching device, the method comprising:
   determining, by a controller circuit coupled to the switching device, whether a measured dead time of the switching device is less than a target dead time, the measured dead time corresponding to a time between a de-assertion of the gate signal and a subsequent time at which asserting the gate signal is enabled;
   determining, by the controller circuit, to turn off the switching device by compensating for a voltage difference caused by a stray inductance;
   increasing an offset voltage in response to the measured dead time being less than the target dead time; and
   decreasing the offset voltage in response to the measured dead time being greater than the target dead time,
   wherein compensating for the voltage difference is performed by controlling a virtual off threshold voltage according to the determination of whether the measured dead time of the switching device is less than the target dead time, and
   wherein the virtual off threshold voltage corresponds to an off threshold voltage minus the offset voltage.

13. The method of claim 12, further comprising:
   increasing the off threshold voltage in response to the offset voltage having a minimum value; and
   decreasing the off threshold voltage in response to the offset voltage having a maximum value.

14. The method of claim 13, further comprising:
   setting the offset voltage to a maximum value of the offset voltage in response to increasing the off threshold voltage.

15. The method of claim 12, further comprising:
   increasing the off threshold voltage in response to the offset voltage having a minimum value for two consecutive switching cycles of the switching device; and
   decreasing the off threshold voltage in response to the offset voltage having a maximum value for two consecutive switching cycles of the switching device.

16. The method of claim 12, further comprising:
   determining whether a measured voltage of the switching device is greater than the virtual off threshold voltage; and
   turning off the switching device in response to the measured voltage of the switching device being greater than the virtual off threshold voltage.

17. The method of claim 16, wherein determining whether the measured voltage of the switching device is greater than the virtual off threshold voltage includes:
   generating a sum voltage by adding the offset voltage to the measured voltage; and
   comparing the sum voltage to the off threshold voltage.

18. The method of claim 16, wherein the switching device is a Synchronous Rectifier (SR) switching device, the stray inductance is an inductance in series with a current through the SR switching device, the measured voltage includes the voltage difference caused by the stray inductance, and the controller circuit is an SR controller.

* * * * *